Sept. 26, 1961 C. W. BROOKS ET AL 3,001,656
EGG BASKET UNLOADER
Filed Aug. 29, 1958 3 Sheets-Sheet 1
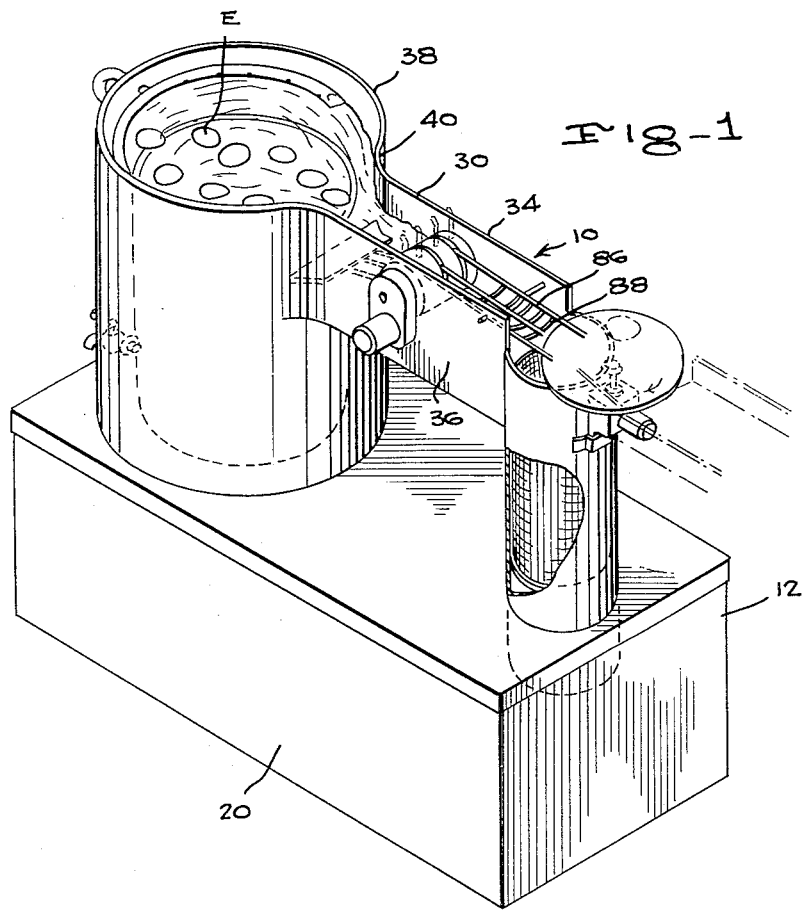
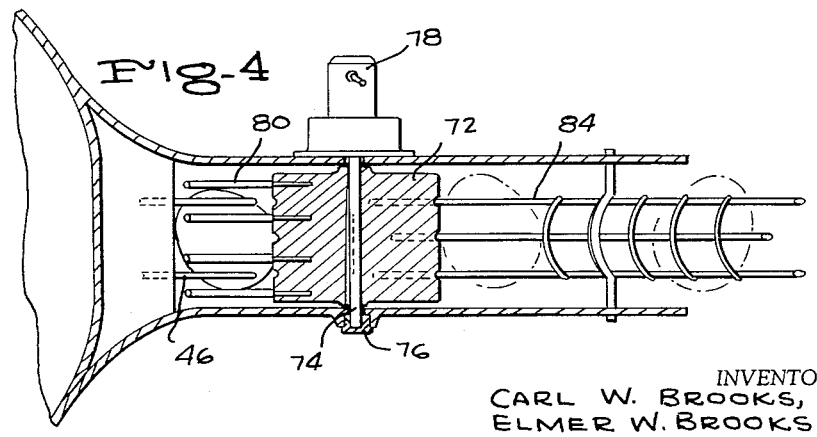
INVENTORS
CARL W. BROOKS,
ELMER W. BROOKS
BY
McMorrow, Berman + Davidson
ATTORNEYS Sept. 26, 1961  C. W. BROOKS ET AL  3,001,656
EGG BASKET UNLOADER
Filed Aug. 29, 1958  3 Sheets-Sheet 2
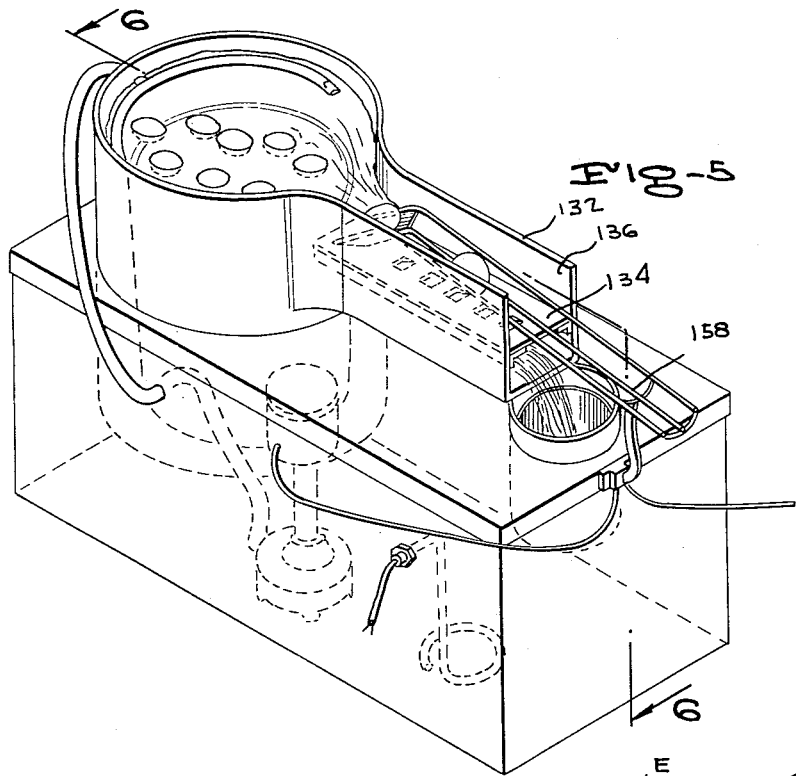
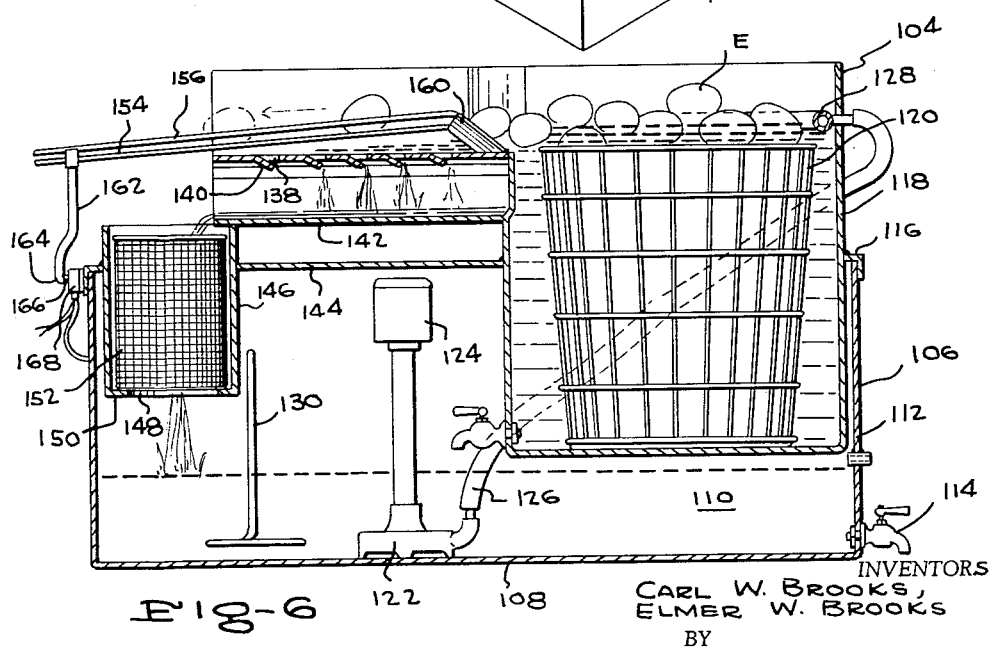
INVENTORS
CARL W. BROOKS,
ELMER W. BROOKS
BY
McMorrow, Berman + Davidson
ATTORNEYS Sept. 26, 1961     C. W. BROOKS ET AL     3,001,656
EGG BASKET UNLOADER
Filed Aug. 29, 1958     3 Sheets-Sheet 3
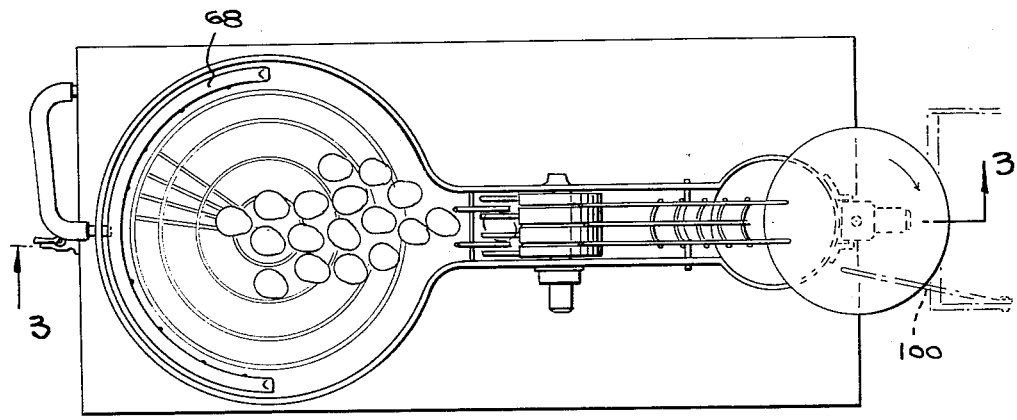
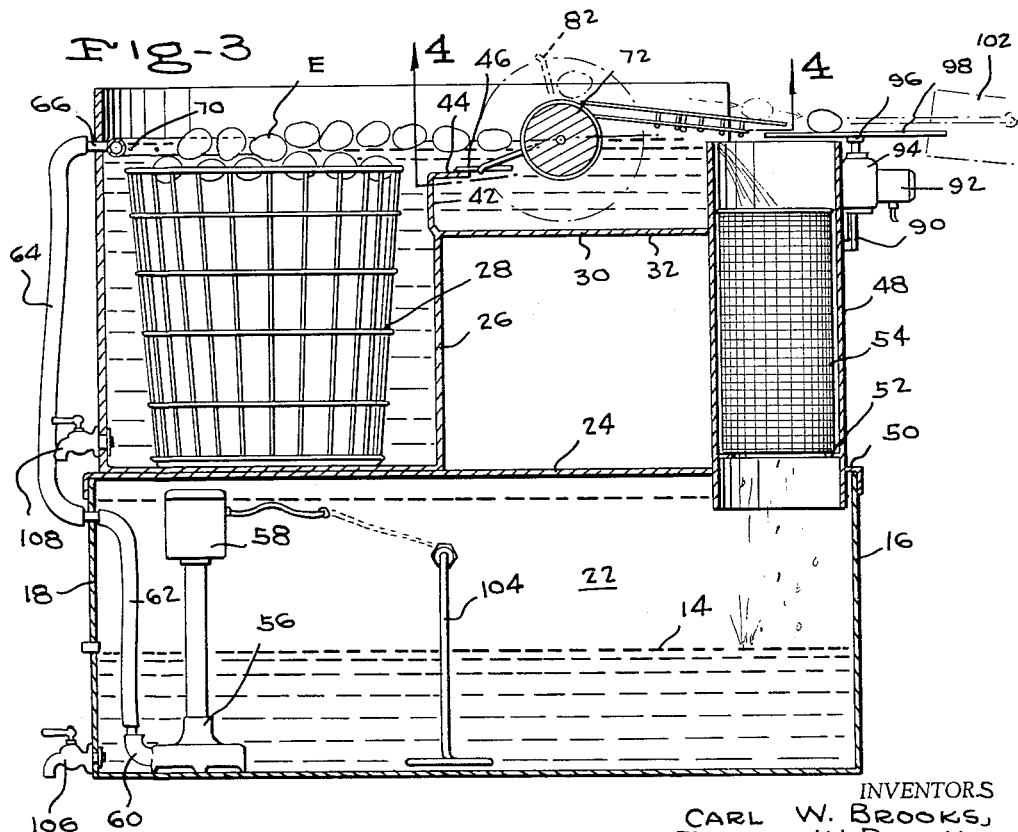
INVENTORS
CARL W. BROOKS,
ELMER W. BROOKS
BY
McMorrow, Berman & Davidson
ATTORNEYS

United States Patent Office 3,001,656
Patented Sept. 26, 1961

3,001,656
EGG BASKET UNLOADER
Carl W. Brooks, Rte. 1, Box 91, Orange Cove, Calif., and Elmer W. Brooks, Rte. 1, Box 3607T, Willits, Calif.
Filed Aug. 29, 1958, Ser. No. 758,037
5 Claims. (Cl. 214—309)

This invention appertains to new and useful improvements in devices for handling eggs and, more particularly, relates to an improved and novel apparatus for removing eggs from the gathering baskets in which they are placed as they are taken from the nests.

A primary object of the present invention resides in the provision of an unloading device for removing eggs from conventional egg baskets by the use of a flowing liquid which acts on the eggs to move them to a delivery means in single, on-by-one fashion, from which latter means the eggs can be delivered to an egg cleaning and candling apparatus or delivered to any other apparatus for subsequent operations.

Another important object of the present invention is to provide a device in which a basket of eggs can be placed, the basket containing the eggs as they are taken from the nests, and the eggs being acted upon by a flowing liquid so as to be moved in one-by-one fashion to a delivery means for subsequent treatment.

A further important object of the present invention resides in the provision of a compact, simple and sturdily constructed apparatus, which involves inexpensively and simply constructed moving parts and which depends, in the main, for its operation upon a flowing liquid which causes a floating of the eggs from the basket onto a delivery means from where they are gathered in one-by-one fashion for subsequent treatment.

A further important object of the present invention is to provide an apparatus which depends upon the action of a moving liquid for its operation, the moving liquid causing eggs to be floated from the usual wire or open mesh basket and to be passed to a delivery means in one-by-one fashion, without any possible damage to the eggs, from which means the eggs can then be passed to any conventional egg cleaning, candling or similar apparatus.

A further important object of the present invention is to provide an egg unloading device which essentially includes a reservoir for a solution, such as brine or, in the case of extremely fresh eggs, water and epsom salts to cause the eggs to float, a receiver for the basket and a delivery means. The basket is disposed in the receiver and a pump means is provided for causing the liquid in the reservoir to be discharged into the receiver and cause the liquid already in the receiver to overflow and thereby cause the eggs to float from the basket. As the eggs float from the basket, they are carried to a delivery means, which may consist of a rotating delivery member or which may be without any moving parts. From such delivery means, the eggs are carried in one-by-one fashion to the outlet thereof from whence they may be manually or mechanically conveyed to an egg cleaning apparatus or to any desired apparatus for subsequent treatment.

The foregoing and ancillary objects are attained by this invention, the preferred embodiments of which are set forth in the following description and illustrated in the accompanying drawings, wherein:

FIGURE 1 is a view in perspective of one form of the present invention;

FIGURE 2 is a top plan view thereof;

FIGURE 3 is a longitudinal, vertical sectional view taken on line 3—3 of FIGURE 2;

FIGURE 4 is an enlarged, detailed sectional view taken on line 4—4 of FIGURE 3;

FIGURE 5 is a perspective view of a modified form of egg unloading apparatus, in accordance with the present invention; and FIGURE 6 is a longitudinal, vertical sectional view taken on line 6—6 of FIGURE 5.

Referring now more particularly to the accompanying drawings, and initially to FIGURES 1-4, the egg unloading device 10 includes a base housing 12, which constitutes a reservoir for the solution 14. The solution 14 may be of any suitable type and it has been found that brine is useful, while, in some instances as with regard to fresh eggs, water and epsom salts are desirable since such solution will cause fresh eggs to rise to the surface. There is no harm in using the epsom salts and water solution, since this is immediately washed off in the subsequent cleaning operation.

The base housing 12 may be of any form or shape and, as illustrated, is rectangular in shape, and includes opposing end walls 16 and 18 and opposing side walls 20 and 22. The base housing is formed with an open upper end, which is closed off by a removable cover or lid 24 having side and end flanges which overhang the sides and ends of the base housing, so as to locate the cover or lid in place.

A tank 26, which constitutes a receiver for a conventional type of open mesh or wire egg basket 28, is mounted on the cover or lid 24, adjacent one end thereof. The tank 26, which is cylindrical, is provided with a radially extending trough 30 that extends towards the other end of the base housing, as shown in FIGURE 1.

The trough 30 includes a bottom wall 32 and parallel side walls 34 and 36, which are spaced apart a predetermined distance, depending upon the delivery rate and number of eggs to be passed through the trough. It is to be particularly noted that the inner ends of the side walls 34 and 36 are joined with the side wall 38 of the tank by very gently rounded juncture portions 40. The gentle rounding of the juncture portions 40, which connect the side walls of the trough with the tank 38, provide a wide throat at the inner end of the trough, where the end joins the tank. The purpose of this wide throat is to prevent any clustering of eggs which would tend to clog the entrance of the trough, as will be described.

The trough 30 is provided with an inner end wall 42, which is constituted by a portion of the wall of the tank 38 and which serves as an inner end wall for the lowermost portion of the trough, the wall 42 having an upper flange portion 44, which is bent towards the horizontal and directed towards the outer end of the trough. Such flange 44 serves as a support for fixed fingers 46, which are spaced laterally apart, for a purpose to be described.

At the outer end of the trough, a cylinder 48 is vertically mounted, with the lower end of the cylinder being disposed in an opening 50 in the cover or lid 24 and thereby being in communication with the interior of the base housing 12. The upper end of the cylinder extends above the bottom wall 32 of the trough to a point slightly above the flange 44.

The cylinder 48 is formed, adjacent its lower end, with an internal, annular shoulder 52, which serves as a support for a cylindrical filter 54, that is provided to capture the nest material or any other debris that may be associated with the eggs.

Pump means 56, which may be in the form of a conventional sump pump, is provided and is housed within the base housing 12 and is provided with an electric motor 58 or other suitable motive means. The pump 56 has its outlet 60 connected to a delivery tube 62, which in turn is connected to a tube 64 that extends externally of the base housing and is connected to a pipe 66 which projects radially through the wall of the tank 38. A semi-circular piping 68 is connected to the pipe 66 and extends around the interior of the tank 38 at its outer side wall, that is at the outer end of the base housing 12, as shown particularly in FIGURES 1 and 2. The piping 68 is provided with a series of openings 70 that are formed on its inner face and the piping is arranged so as to overlie and extend substantially around the open upper end of the basket 28. The piping 68 is arranged above the overflow level of the tank 38, which level is defined by the flange 44, in conjunction with the trough 30. It is preferably provided in such a way that it encircles the basket 28 at the outer end portion of the tank 38, so as to prevent the formation of whirlpools or "dead spots." The openings or holes 70 are formed, preferably, at three inch intervals and the ends of the piping or tubing 68 are flat so that water from both sides of the piping or tubing 68, considering the sides from the tube 66, converge in the entry of the trough. In other words, the openings are formed so that the solution is directed towards the throat of the trough and a skimming action is provided, which causes the eggs E to float from the basket and be forced, under a gentle force, towards the throat of the trough.

Operatively disposed within the trough and arranged transversely thereof is a drum 72, which is rotatably carried by a drive shaft 74. The drive shaft is mounted in suitable bearings 76 provided in the walls of the trough and is rotated by a power unit 78, which may be an electric motor, provided with suitable reduction gearing. The drum 72 is provided with circumferentially spaced, radially extending sets of fingers 80, which are spaced apart so as to move between the fixed teeth or fingers 46, that are carried by the flange 44. The fingers 80 radially extend from the drum 72 and are formed at their outer extremities with curved ends 82 that are curved in a direction opposite to the clockwise rotation of the drum.

The fingers 80 are provided to move between the fixed fingers or teeth 46 and raise the eggs E in one-by-one fashion, as they float above the flange 44, as shown in FIGURE 3. The fingers during the rotation of the drum, carry the eggs in one-by-one fashion onto an outlet or delivery chute 84. The outlet or delivery chute 84 is composed of parallel wires 86, which are connected by concave, transversely disposed wires 88, the outermost wires 86 being spaced above the center wire so as to form a concavo-convex delivery or outlet chute. The delivery or outlet chute is inclined toward the outer end of the apparatus, that is, from the drum towards the outer end or above the cylinder 48, the outermost wires 86 extending well beyond the center of the cylinder 48, while the innermost wire or wires (as the case may be) terminate well before the center of the cylinder 48.

A bracket means 90 is provided to mount an electric motor 92, or similar motive means, onto the outer face of the cylinder 48 and to support, in operative conjunction with the electric motor 92, a gear reduction means 94. A shaft 96 upstands from the gear reduction housing 94 and rotatably supports a horizontally disposed plate 98, over which the outer wires 86 of the trough extend, as shown in FIGURE 1. The plate 98, which is circular, but which may be of any particular shape, is rotated through the gear reduction means 94 under the motive power of the motor 92, and rotates, as the eggs are delivered onto the upper surface of the plate from the outlet or delivery chute 84. A finger 100 is fixedly disposed on a suitable conveyor means 102, disposed adjacent to the plate 98 and positioned so as to receive the eggs from the plate. The finger 100 extends over the plate in a fashion so that, as the plate rotates in a clockwise direction, the eggs on the upper surface of the plate abut the finger and are directed thereby onto the conveyor means 102 from whence they are carried to a suitable cleaning, candling or other apparatus.

A thermostatically controlled heater 104 is submerged within the liquid 14 in the tank housing 16 and is provided to slightly warm the liquid or solution, so that the eggs E being encountered by the warm solution begin to expand very slightly. For this reason, it is thought that the eggs will not admit bacteria, since the eggs are expanded under the slightly warm solution, whereas with a cold solution, the eggs would shrink and tend to admit bacteria.

For the convenience of cleaning the base housing 12, a spigot or faucet means 106 is provided. For similar reasons the tank 38 is also provided with a cleaning faucet 108.

In operation, the open mesh or wire basket 28, which contains a quantity of eggs as they are removed from the nests, is placed within the tank 38, as shown in FIGURE 3. The eggs E are contained within the basket in no specific order, rather being placed therein at random as they are collected from the nests. The motor 58 of the pump 56 is then placed in operation, together with the heating means 104, the latter being provided for the purpose of heating the fluid 14, which may be of any particular type, as explained. Upon the operation of the pump 56, the fluid is forced from the aperture 70 and the fluid causes the eggs to move into and through the throat of the trough 30.

The eggs are floated above the flange 44, as shown in FIGURE 3, and pass into the throat of the trough. As the eggs enter the trough, above the fixed fingers 46, they are entrained, in one-by-one fashion, by the fingers 80 of the drum 72, as shown in FIGURE 3. The fingers capture the eggs in one-by-one fashion and raise the eggs above the solution and then discharge them onto the outlet or delivery chute 86, which is composed of the spaced apart and parallel wires but which may be formed of solid material, being provided with suitably formed and disposed apertures, for the release of the liquid or fluid. The eggs move in sliding fashion down the inclined chute and the entrained nesting material or other debris is discharged, along with the liquid or solution, into the cylinder 48, with the nesting material or debris being entrained and captured by the filter 54, whereas the fluid drops back into the base tank 12. The eggs are discharged onto the rotating turntable or plate 98 and, as the turntable or plate rotates, the eggs abut the fixed finger 100 and are thereby directed onto the conveyor means 102 for passage to subsequent treating apparatuses, such as cleaning or candling devices.

A modified form of the present invention is illustrated in FIGURES 5 and 6, wherein the egg unloading apparatus 104 includes a base tank 106, which may be of any particular shape but, as illustrated, is of a rectangular configuration. The base tank 106 is formed with a bottom wall 108, opposing side walls 110 and opposing end walls 112. An outlet valve or faucet means 114 is operatively associated with one of the end walls 112.

The base tank is formed with an open upper end, which is closed off by a removable lid or top wall 116 having suitable side and end flanges to locate it in position. Associated with the lid is a tank 118, which receives the basket 120 containing the eggs E. A pump means 122, which is driven by the motor means 124 is operatively associated with the tank 118 through a conduit means 126 and a semi-circular outlet pipe or tubing 128 is mounted within the tank 118 and connected to the hose 126, to serve as a connection means between the pump and tank for the purpose of distributing the fluid or liquid into the tank and thereby float the eggs E from the basket.

As in the case of the unloader, as shown in FIGURES 1–4, a submerged and thermostatically controlled heater means 130 is mounted within the base tank 106 for the purpose of heating the liquid therein, as has been described.

A trough 132 radially projects from the inner side of the tank 104 and is defined by a bottom wall 134 and opposing side walls 136, which at their inner ends are blended by curved juncture walls into the wall of the cylindrical tank. The bottom wall 134 is formed with a series of longitudinally spaced openings 138, that are defined by downwardly struck portions or tongues 140.

Below the thus apertured or opened wall 134 of the trough is a solid wall 142, which serves as a drain-off wall for the liquid or solution. The wall 142 is vertically spaced from a wall 144, which serves as a support for a vertically disposed cylinder 146, having an open lower end 148 that is formed with an internally directed annular flange 150. A cylindrical filter element 152 is disposed within the cylinder 146 and is seated on the flange 150 and is provided to receive the escaping fluid and to filter the fluid, as it flows back to the base tank and to capture the nesting material or any other debris.

The unloader, as shown in FIGURES 5 and 6, is devoid of any moving parts and, therefore, the eggs are moved without the provision of a rotating drum 72, as is associated with the form of the invention, which is illustrated in FIGURES 1–4.

In the form of the invention, as shown in FIGURES 5 and 6, the outlet or delivery trough 154 is composed of parallel bars 156, which are connected by transverse bars 158 and arranged in a relationship so that a concavo-convex delivery surface is provided, the trough being inclined downwardly relative to the outlet end of the unloading apparatus. At the inner end of the trough, a solid bottom wall portion 160 is provided, which solid bottom wall portion is inclined upwardly and which serves to enable the fluid or solution to raise the eggs above the top level of the tank 104 and move them onto the downwardly inclined trough. It is to be particularly noted that the trough is formed from flexible material, so that, upon the accumulation of a considerable number of eggs on the delivery or outlet trough, there is a tendency for the trough to flex downwardly.

Such downwardly flexing movement of the trough is used to advantage in controlling the operation of the pump, thereby interrupting the floating of the eggs E onto the trough. In this regard, an arm 162 depends from the trough, adjacent its outer end. The arm 162 terminates in a lower actuating end 164, which confronts a button switch 166 that is a part of a switch assembly 168, which is spring biased into its normal operating position and which is formed as a part of the electrical circuit for the pump. In the normal, outwardly extending position of the button 166, the spring bias means completes the contact for the operation of the pump. However, upon the accumulation of a predetermined number of eggs upon the trough 156, the trough is depressed, which causes the arm 162 to move the button contact 166 inwardly and thereby interrupt the electrical circuit for the pump. This enables the pump to become inoperative and thereby prevents the accumulation of an unwielding number of eggs upon the trough.

In operation, the egg unloader of FIGURES 5 and 6 is similar to the egg unloader of FIGURES 1–4, in that the operation of the pump produces a current in the tank 104 which causes a floating action of the eggs and a movement of the eggs towards the throat of the trough 132, whereupon the eggs are caused to slide upwardly on the inner closed end 160 of the outlet or delivery chute and then to slide and roll in one-by-one and single fashion downwardly on the chute. As the eggs move downwardly on the chute, the overflow of water flows through the apertures 138 and reaches the solid wall 142 whereupon the water or similar solution passes downwardly into the base tank through the filter 152, which collects the nesting material or other debris.

While the preferred embodiments of this invention have been illustrated and described herein, other forms may be realized, as come within the scope of the appended claims and, in this respect, it is to be particularly noted that both forms of the present invention demonstrate the generic concept of the use of a forced liquid in moving eggs from a basket or similar receptacle and conveying them from the receptacle, in which they are placed as they are gathered from the nest, to suitable cleaning, candling or other apparatuses.

What is claimed is:

1. An apparatus for unloading eggs from a basket in which they are placed as they are removed from the nests, said apparatus comprising a housing including a reservoir for a fluid and a compartment in which the basket with eggs is seated, a horizontally-disposed semicircular discharge piping extending about the interior of said compartment adjacent to and spaced below the top of said compartment, pump means conveying fluid from the reservoir to said piping and establishing a flowing fluid pool in the compartment for floating eggs out of the basket, said compartment having an upper end formed with a convergent passage establishing an overflow outlet means through which the eggs are floated in one-by-one fashion, a narrow, elongated trough of a width to only accommodate the eggs in single fashion extending from the compartment and having a bottom formed with openings large enough for the fluid and any nest debris to flow out through but small enough to prevent the eggs from passing therethrough, said trough being inclined downwardly and outwardly from the compartment for the gravity sliding in one-by-one fashion of the eggs, said trough having an inner upper end and an outer lower end, said inner end being disposed above and outwardly from and in alignment with the outlet means and means for raising the eggs in one-by-one fashion onto the inner end of the trough.

2. An apparatus for unloading eggs from a basket in which they are placed as they are removed from the nests, said apparatus comprising a housing including a reservoir for a fluid and a compartment in which the basket with eggs is seated, a horizontally-disposed semicircular discharge piping extending about the interior of said compartment adjacent to and spaced below the top of said compartment, pump means conveying fluid from the reservoir to said piping and establishing a flowing fluid pool in the compartment for floating eggs out of the basket, said compartment having an upper end formed with a convergent passage establishing an overflow outlet means through which the eggs are floated in one-by-one fashion, a narrow, elongated trough of a width to only accommodate the eggs in single fashion extending from the compartment and having a bottom formed with openings large enough for the fluid and any nest debris to flow out through but small enough to prevent the eggs from passing therethrough, said trough being inclined downwardly and outwardly from the compartment for the gravity sliding in one-by-one fashion of the eggs, said trough having an inner upper end and an outer lower end, said inner end being disposed above and outwardly from and in alignment with the outlet means and means for raising the eggs in one-by-one fashion onto the inner end of the trough, said last named means including an upwardly inclined plate lying within the passage in direct communication therewith and connected to the inner end of the trough and of a convergent shape with its upper end being of the same width as the trough.

3. An apparatus for unloading eggs from a basket in which they are placed as they are removed from the nests, said apparatus comprising a housing including a reservoir for a fluid and a compartment in which the basket with eggs is seated, a horizontally-disposed semicircular discharge piping extending about the interior of said compartment adjacent to and spaced below the top of said compartment, pump means conveying fluid from the reservoir to said piping and establishing a flowing fluid pool in the compartment for floating eggs out of the basket, said compartment having an overflow outlet means through which the eggs are floated in one-by-one fashion, a narrow, elongated trough of a width to only accommodate the eggs in single fashion extending from the compartment and having a bottom formed with openings large enough for the fluid and any nest debris to flow out through but small enough to prevent the eggs from passing therethrough, said trough being inclined downwardly and outwardly from the compartment for the gravity sliding in one-by-one fashion of the eggs, said trough having an inner upper end and an outer lower end, said inner end being disposed above and outwardly from and in alignment with the outlet means and means for raising the eggs in one-by-one fashion onto the inner end of the trough, said last named means including an upwardly inclined imperforate plate lying within the outlet means and connected to the inner end of the trough and of a convergent shape with its upper end being of the same width as the trough.

4. An apparatus for unloading eggs from a basket in which they are placed as they are removed from the nests, said apparatus comprising a housing including a reservoir for a fluid and a compartment in which the basket with eggs is seated, pump means conveying fluid from the reservoir to the compartment and establishing a flowing fluid pool in the compartment for floating eggs out of the basket, said compartment having an upper end formed with a convergent radial passage defining an overflow outlet means through which the eggs are floated in one-by-one fashion, a trough extending from the compartment and having a bottom formed with openings large enough for the fluid and any nest debris to flow out through but small enough to prevent the eggs from passing therethrough, said trough being narrow and elongated and of a width only to accommodate the eggs in single fashion and being inclined downwardly and outwardly from the compartment for the gravity sliding in one-by-one fashion of the eggs, said trough having an inner upper end and an outer lower end, said inner end being disposed above and outwardly from and in alignment with the outlet means and means for raising the eggs in one-by-one fashion onto the inner end of the trough, said passage having a bottom wall inclined slightly upwardly and having an outer end terminating in laterally spaced fingers, said last named means including a drum rotatably mounted transversely between the bottom wall of the passage and the inner end of the trough and arranged at the inner end of the trough with its axis located between the bottom wall of the passage and the inner end of the trough and having radial fingers to lift the eggs one-by-one from the pool and deposit them on the trough with the radial fingers interfitting between the fingers on the bottom wall of the passage.

5. An apparatus for unloading eggs from a basket in which they are placed as they are removed from the nests, said apparatus comprising a housing including a reservoir for a fluid and a compartment in which the basket with eggs is seated, pump means conveying fluid from the reservoir to the compartment and establishing a flowing fluid pool in the compartment for floating eggs out of the basket, said compartment having an overflow outlet means through which the eggs are floated in one-by-one fashion, a trough extending from the compartment and having a bottom formed with openings large enough for the fluid and any nest debris to flow out through but small enough to prevent the eggs from passing therethrough, said trough being inclined downwardly and outwardly from the compartment for the gravity sliding in one-by-one fashion of the eggs, said trough having an inner upper end and an outer lower end, said inner end being disposed above and outwardly from and in alignment with the outlet means and means for raising the eggs in one-by-one fashion onto the inner end of the trough, and a rotatable turntable underlying the outer end of the trough, a motor means for the pump means and switch means actuated by movement of the trough under the weight of a predetermined number of eggs for operating the switch means to interrupt the motor means.

References Cited in the file of this patent

UNITED STATES PATENTS

| | | |
|---|---|---|
| 1,642,421 | Lorenz | Sept. 13, 1927 |
| 1,744,363 | Chapman | Jan. 21, 1930 |
| 1,960,339 | Howard | May 29, 1934 |
| 2,752,926 | James | July 3, 1956 |
| 2,877,896 | Jones | Mar. 17, 1959 |